March 3, 1931.   H. H. LOWENSTEIN   1,794,466
ADVERTISING NOVELTY
Filed March 26, 1928   3 Sheets-Sheet 1

Inventor
Herman H. Lowenstein
Daniel Brennan
Attorney

March 3, 1931.    H. H. LOWENSTEIN    1,794,466
ADVERTISING NOVELTY
Filed March 26, 1928    3 Sheets-Sheet 2
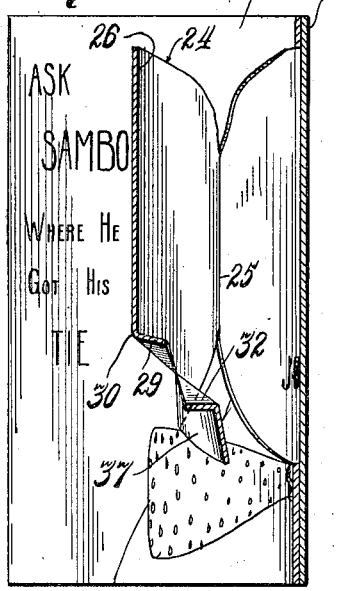
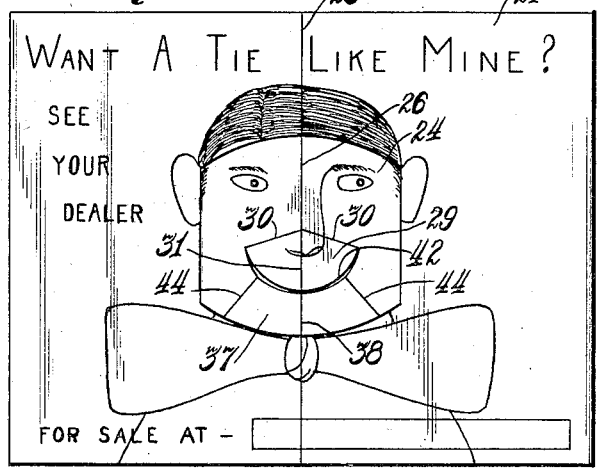
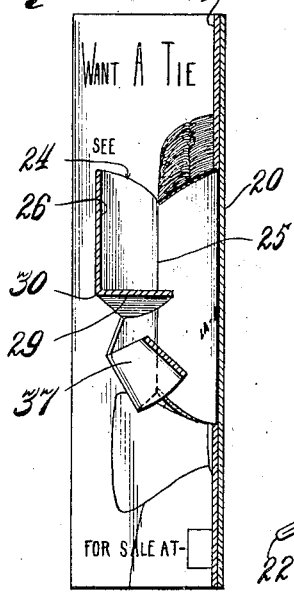
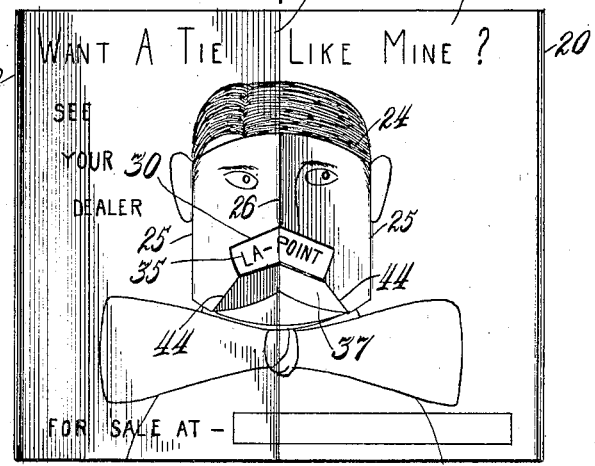
Inventor
Herman H. Lowenstein
Attorney

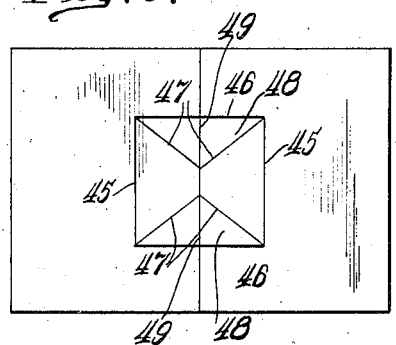
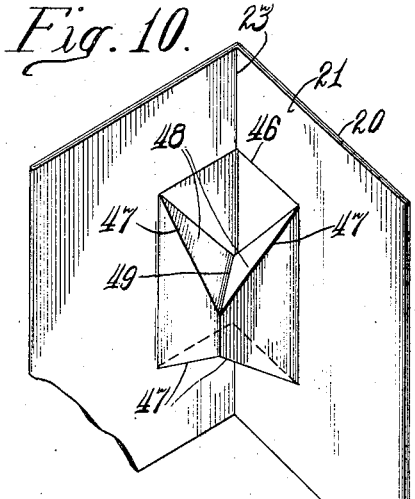
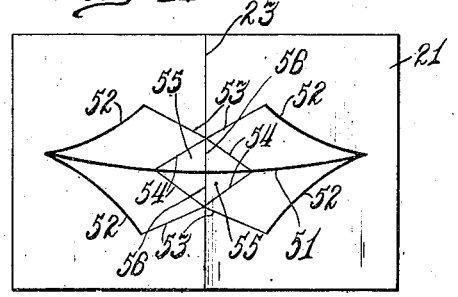
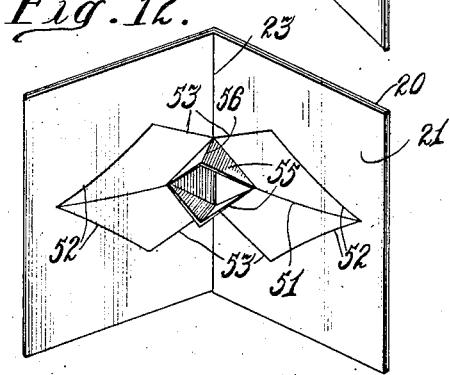
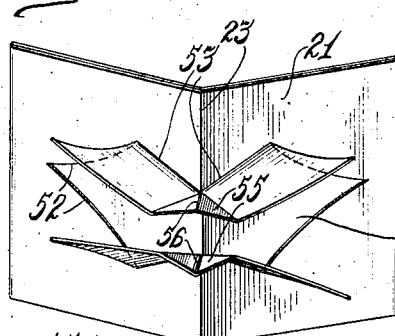
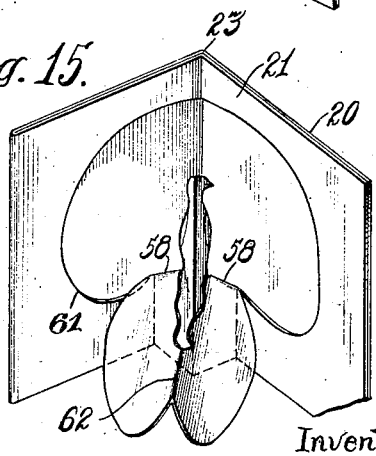
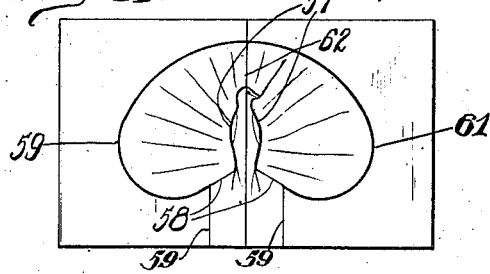
Inventor
Herman H. Lowenstein
Attorney Patented Mar. 3, 1931

1,794,466

UNITED STATES PATENT OFFICE

HERMAN H. LOWENSTEIN, OF CHICAGO, ILLINOIS, ASSIGNOR TO REGENSTEINER CORPORATION, OF CHICAGO, ILLINOIS, A CORPORATION OF ILLINOIS

ADVERTISING NOVELTY

Application filed March 26, 1928. Serial No. 264,978.

The invention relates to improvements in advertising novelties, and has for its object the provision of an improved construction of this character adapted and arranged to provide animated figures for advertising purposes.

Another object of the invention is to provide a device of this character adapted and arranged for producing motion of such an animated figure which will accord with printed matter thereon.

Another object of the invention is to provide a novel device especially adapted for providing animated figures as a means of furnishing entertaining and educational matter in books, valentines, greeting cards and the like.

Another object of the invention is the provision of a device of this character which may be manufactured at low cost.

Other objects will appear hereinafter.

The invention consists in the combinations and arrangements of parts hereinafter described and claimed, and will be best understood by reference to the accompanying drawings forming a part of this specification and in which:

Fig. 4 is a section taken substantially on line 4—4 of Fig. 2.

Fig. 5 is a view similar to Fig. 1 but showing a modified form of construction.

Fig. 6 is a similar view, but showing the modified device partially folded.

Fig. 7 is a section taken substantially on line 7—7 of Fig. 6.

Fig. 8 is a top plan view of the device shown in Fig. 6.

Fig. 9 is a front view of another modified construction.

Fig. 10 is a perspective view showing the device of Fig. 9 partially folded.

Fig. 11 is a view of another form of construction.

Fig. 12 is a corresponding perspective view showing the device of Fig. 11 partially folded.

Fig. 13 is a perspective view showing the construction of Figures 11 and 12 in a different relation.

Fig. 14 is a view showing another modified form of construction.

Fig. 15 is a persepctive view of the device of Fig. 14 partially folded.

The form of construction illustrated in Figures 1, 2, 3, and 4 comprises outer and inner backing members 20 and 21 formed from a single strip of paper cardboard, or the like, folded upon itself along the line 22, said backing sheets being again folded along a central vertical line 23, as shown. An animated figure 24, preferably in the form of a human head, is formed from the inner backing sheet 21 by cutting or severing the upper and lower edges thereof and creasing along the side lines 25 to form a vertical hinged connection between the sides of the head figure and the inner backing sheet 21.

Figure 3:
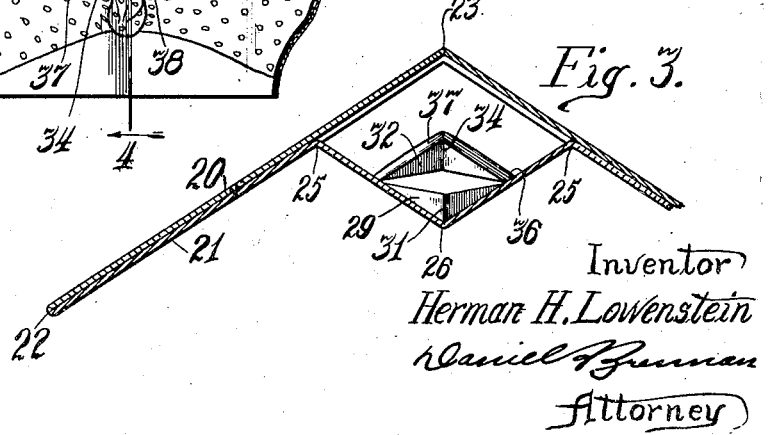
Fig. 3 is a section taken substantially on line 3—3 of Fig. 2.

A central vertical crease 26 is provided in the figure thus defined permitting the outward folding thereof, as indicated in Fig. 3. Ear members 27 are also cut from the backing sheet 21 at the sides of said head figure, being connected with said head figure along the creased lines 25, as shown.

Figure 2:
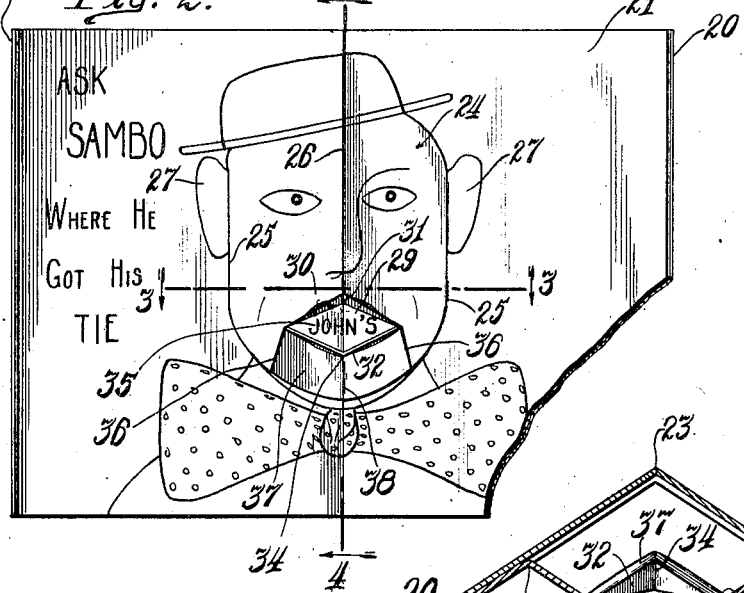
Fig. 2 is a similar view of the same device partially folded.

A central transverse slit 28 is provided at the mouth portion of said head figure and an upper lip portion 29 is defined by upwardly and inwardly converging creased lines 30, a vertical central crease 31 being provided in said lip portion to permit of inward folding thereof, as indicated in Fig. 4. A similar lower lip portion 32 is defined by downwardly converging creases 33 and a central crease 34 and arranged for outward folding as indicated in Fig. 4. A printed designation 35 is also arranged on the backing sheet 20 immediately behind the slit 29 so as to be visible through the mouth opening when the same is opened, as indicated in Fig. 2. Downwardly diverging side creases 36 also extend from the outer ends of the slit 28, thereby defining a chin portion 37 which has a central crease 38 for inward folding as indicated in Fig. 4.

Figure 1:
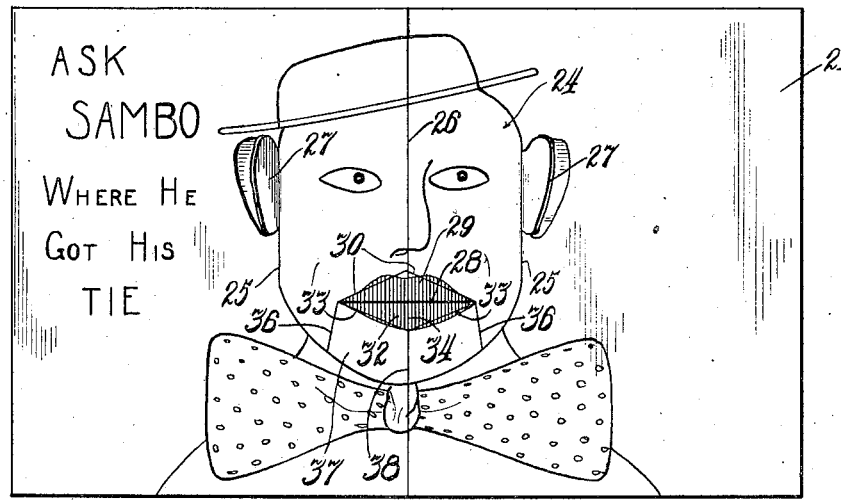
Fig. 1 is a front elevation of an advertising novelty embodying the invention and shown as spread out flat.

The arrangement is such that when the device is spread out flat, as indicated in Fig. 1, the mouth portion or opening will be closed but the ears 27 will extend slightly outwardly, as indicated in Fig. 1. When the backing sheets are partially closed or folded, as indicated in Fig. 3, the upper lip portion 29 will be folded inwardly and the lower lip portion 32 will be folded outwardly to provide a widely opened mouth space so as to disclose the printed matter behind. If desired, the backing sheet 21 may contain a question, as indicated, and the printed matter back of the mouth may constitute the answer to said question, as will be readily understood, the advertising value of such arrangement being obvious.

In the form of construction illustrated in Figures 5, 6, 7 and 8, a headed member 24 is provided which is in the main the same as the head member already described. However, in this instance, the mouth is defined by a downwardly concave or crescent-shaped slit 42, the upper creases 30 extending from the ends of said slit thereby defining an upper lip portion adapted and arranged to fold inwardly as indicated in Fig. 7 when the backing members are partially folded. Also, the chin member 37 is defined by downwardly extending divergent creases 44 extending from the sides of the slit 42 thereby providing a chin portion of slightly different shape from that already described. Otherwise the construction is the same.

In the form of construction illustrated in Figures 9 and 10, a central rectangular member is defined by vertical creases 45 and top and bottom slits 46. Diagonal converging creases 47 are extended from the corners of said body to define, with the top and bottom edges thereof, triangular portions 48 which are centrally creased at 49, thereby forming a body which projects and creases as indicated in Fig. 10 when the backing members are partially folded or closed.

In the form of construction illustrated in Figures 11, 12 and 13, two oppositely disposed similar bodies are defined by a transverse slit 51 and upwardly and downwardly extending converging slits 52 connecting the ends of the slit 51 with the ends of the divergent creases 53, as shown. Additional divergent creases 54 are extended from the inner sections of creases 53, thereby defining triangular portions 55 which also have central creases 56, as shown. The two oppositely disposed bodies thus produced closely resemble butterfly wings and will assume the positions indicated in Fig. 12 when the backing sheets are partially folded or the positions indicated in Fig. 13, when said backing sheets are partially folded in the other direction, thereby closely imitating the action of a butterfly's wings.

In the form of construction illustrated in Figures 14 and 15, a central lower body is defined by slits 57, diagonal creases 58, side creases 59, and a central crease 60, said body thus defined being in general the body of a peacock. A tail for the peacock is defined by slits or cuts 61, said tail being thus joined to the body only along the creased lines 58. The tail portion thus defined is centrally creased along the line 62. The arrangement is such that the tail folds downwardly and forwardly over the body portion when the backing sheets are folded together as indicated in Fig. 15.

Obviously all of the modified forms of construction may be variously employed in conjunction with advertising, educational or other matter and used to attract attention thereto with obvious advantages.

While I have illustrated and described the preferred forms of construction for carrying my invention into effect, these are capable of variation and modification without departing from the spirit of the invention. I, therefore, do not wish to be limited to the precise details set forth, but desire to avail myself of such variations and modifications as fall within the scope of the appended claims.

I claim:

1. A device of the class described comprising inner and outer backing members hingedly connected for folding along a medial vertical line, an animated figure member in the form of a human head hingedly connected to the inner backing member along vertical lines at the sides, said animated figure being free at top and bottom, and provided with a central vertical crease, and a transverse slit at the mouth portion of said head, there being diagonal creases connected with the ends of said slit and roughly defining lips, one of said lips being creased and arranged to be folded inwardly and the other creased and arranged to be folded outwardly.

2. A device of the class described comprising inner and outer backing members hingedly connected for folding along a medial vertical line, an animated figure member in the form of a human head hingedly connected to the inner backing member along vertical lines at the sides, said animated figure being free at top and bottom, and provided with a central vertical crease, a transverse slit at the mouth portion of said head, there being diagonal creases connected with the ends of said slit and roughly defining lips, one of said lips being creased and arranged to be folded inwardly and the other creased and arranged to be folded outwardly, and ear members for said head cut from the adjoining portions of said inner backing sheet and joined to said head along vertical side creases.

3. A device of the class described comprising inner and outer backing members hingedly connected for folding along a medial vertical line, an animated figure member in the form of a human head hingedly connected to the inner backing member along vertical lines at the sides, said animated figure being free at top and bottom and provided with a central vertical crease, a transverse slit at the mouth portion of said head, there being diagonal creases connected with the ends of said slit and roughly defining lips, one of said lips being creased and arranged to be folded inwardly and the other creased and arranged to be folded outwardly, converging creases extending downwardly from the outer ends of said slit, and a movable chin member for said head defined in part by said creases.

In testimony whereof I affix my signature at 10 South La Salle Street, Chicago, Illinois.

HERMAN H. LOWENSTEIN.